（12）United States Patent
Chrabieh

(10) Patent No.: US 8,161,453 B2
(45) Date of Patent: Apr. 17, 2012

(54) METHOD AND APPARATUS FOR IMPLEMENTING TASK MANAGEMENT OF COMPUTER OPERATIONS

(76) Inventor: Rabih Chrabieh, San Diego, CA (US)

( * ) Notice: Subject to any disclaimer, the term of this patent is extended or adjusted under 35 U.S.C. 154(b) by 1787 days.

(21) Appl. No.: 11/280,667

(22) Filed: Nov. 15, 2005

(65) Prior Publication Data

US 2006/0107268 A1    May 18, 2006

Related U.S. Application Data

(60) Provisional application No. 60/627,887, filed on Nov. 16, 2004, provisional application No. 60/651,879, filed on Feb. 11, 2005.

(51) Int. Cl.
*G06F 9/44* (2006.01)

(52) U.S. Cl. .................. 717/106; 717/117; 717/120

(58) Field of Classification Search .................. None
See application file for complete search history.

(56) References Cited

U.S. PATENT DOCUMENTS 4,538,138 A  *  8/1985  Harvey et al. ............... 340/521
6,317,872 B1 *  11/2001  Gee et al. ...................... 717/152

* cited by examiner

*Primary Examiner* — Chuck Kendall
(74) *Attorney, Agent, or Firm* — Michael D. Eisenberg

(57) ABSTRACT

A development and runtime framework for applications that execute in real-time operating systems. Application development is enhanced through simple instructions that allow a programmer to declare functions and sets of functions as tasks and supertasks, respectively, and manage the execution of functions, tasks and supertasks with priorities. A compiler or pre-processor provides tools for generating the code for tasks and supertasks, and the management code for managing execution. Function calls may be made directly to functions within supertasks via respective entrypoints, and the tasks are managed based on the functions being invoked. Within a supertask, a higher priority function may be runnable while a lower priority function of that supertask is suspended. A cookie is used to recognize when a register update for a supertask may be omitted, enabling more efficient context switching.

27 Claims, 6 Drawing Sheets

METHOD AND APPARATUS FOR IMPLEMENTING TASK MANAGEMENT OF COMPUTER OPERATIONS

CROSS-REFERENCES TO RELATED APPLICATIONS

This application claims the benefit of U.S. provisional patent application No. 60/627,887, filed Nov. 16, 2004, and U.S. provisional patent application No. 60/651,879, filed Feb. 11, 2005, which are herein incorporated by reference in their entirety.

FIELD OF THE INVENTION

The invention relates to computer software, and more specifically to software for enabling operating systems and applications to manage real-time operations.

A portion of the disclosure of this patent document contains material that is subject to copyright protection. The copyright owner has no objection to the facsimile reproduction by anyone of the patent document or the patent disclosure, as it appears in the Patent and Trademark Office file or records, but otherwise reserves all copyrights associated with this document.

BACKGROUND OF THE INVENTION

Real-time operating environments enable computers to perform time-constrained functions. Examples of time-constrained functions include executing tasks at regular time intervals (e.g., automatically updating a user interface), running a program at a given time (e.g., reading input from a peripheral for a given period of time), or delaying the execution of a task for a given time period. Any of the latter functions may be triggered, for example, by a timer and/or a software event.

A real-time operating system typically comprises a kernel and a number of applications and drivers. The kernel is the part of the operating system that manages the execution of applications and the inputs and outputs through drivers. A task, in computer code terms, is a piece of code (e.g., computer application or a part thereof) designed to enable the computer to provide a given functionality.

Modern real-time operating systems are able to virtually simultaneously execute more than one task by switching from one task to another, an operation that requires sharing execution time in a scheduled manner (conventionally referred to as "time-slicing"). The kernel determines, at each time period, the next task to execute/resume. Thus, in existing real-time operating systems, each task must be designed to be able to execute, suspend execution, resume execution, and stop. For instance, a task may need to stop in order to wait for new input, or when it is preempted by another task.

The system utilizes a stack to be able to store the state of a task when stopping its execution, and re-establish its state when the execution resumes. Since modern programs typically use a stack to execute function calls, a task needs its own stack in order to run, stop and resume running. For example, in the case of switching from a task "A" to a task "B", the system switches the execution context from task "A" to task "B" by saving the registers of task "A" to stack of "A", then restoring previously-saved registers of task "B" from stack of "B". In existing operating environments a task possesses an entry point that is unique, a mailbox (or message queue) for receiving messages, and a dispatcher for dispatching messages, each linked to the appropriate part of the program code within the task once it is invoked.

The purpose of a task-based architecture in real-time operating systems is the ability to handle multiple time-sensitive tasks, thus the need to switch between multiple tasks on the basis of each task's priority level. At each time slice (or following an interrupt), the real-time operating system uses the priority level to determine the next task to be executed. For instance, a low priority task can run the main algorithms, while a higher priority task can execute time sensitive code. The high priority task conventionally preempts the low priority task at almost any point in time.

Existing real-time operating systems present many limitations with regard to task management, however. For a software engineer, developing programs for a real-time operating system is a time-consuming and error prone endeavor. A programmer must manually assign priority levels and create messages for communications between different tasks. For example, if a function "F" runs within task "A", it is impossible to call it from task "B" in existing systems. The way to call function "F" is by sending a message to task "B", the message containing information regarding which function to call and including the parameters to pass to function "F". In existing real-time operating systems architecture, the developer is compelled to manually assign functions to tasks and write messages to transmit between tasks, which increases development time and reduces the modularity of a program.

Therefore, there is a need for an improved architecture that allows a programmer to automatically implement program management tools in order to facilitate runtime task switching and management.

SUMMARY OF THE INVENTION

The present invention provides a development framework and runtime environment for applications enabled to execute in a real-time operating system. In embodiments of the invention, program code may be implemented as tasks and sets of tasks.

Embodiments of the invention allow a developer to attribute priority level characteristics to tasks and supertasks, which allows a system to manage code execution at run-time. Elements of the invention may be implemented in a compiler and/or pre-processor to allow a developer to easily include directives into the source code so that the compiler may add the proper code in the runtime program code.

The invention also allows program code to execute tasks and supertasks while optimizing performance and memory usage. The program functions are implemented in a manner that allows the system to attribute a priority level to each function (referred to herein as a "priority function") and to manage functions calls based on their respective priority level. A priority function may be called similarly to standard functions with the added ability of calling such functions directly from a different application, pausing the execution and resuming execution while having minimal effect on the state of the processor at the end of the execution.

In addition, a priority function may be called through a direct invocation from another function, through a hardware interrupt, following a timer interrupt event, and following a signal interrupt.

Embodiments of the invention allow a developer to implement and manage a set of tasks or subtasks, referred to herein as a "supertask". A supertask may comprise any number of tasks. The supertask may possess (or share) resources such as stacks to manage invocation of functions within the supertask.

An embodiment of the invention allows a developer to easily include directives that a compiler (and/or a pre-processor) embodying the invention may automatically translate into code that enables a program to execute and manage supertasks.

At runtime, a system implementing the invention runs supertasks while optimizing code execution and memory usage. For example, a task may be invoked when one of its priority functions is invoked. A supertask allows for invoking its subtasks individually. The system manages the calls to each of the supertask's functions by sharing stacks where the information about the status of the execution is stored. The invention allows for pausing, waiting and resuming the execution of functions, and further allows for invocation of the same function from different supertasks. In addition, a function may be invoked at different priority levels and executed by interposition.

One or more embodiments of the invention provide a method and apparatus for storing processor states in a cookie, and using the cookie to allow for supertask management. A task may also be enabled to check the cookie. When invoked, a task may verify the state of the processor against the contents of the cookie. The task may then determine whether the registers of the processor are to be set to a given state before proceeding to execution.

DETAILED DESCRIPTION

Figure 1:
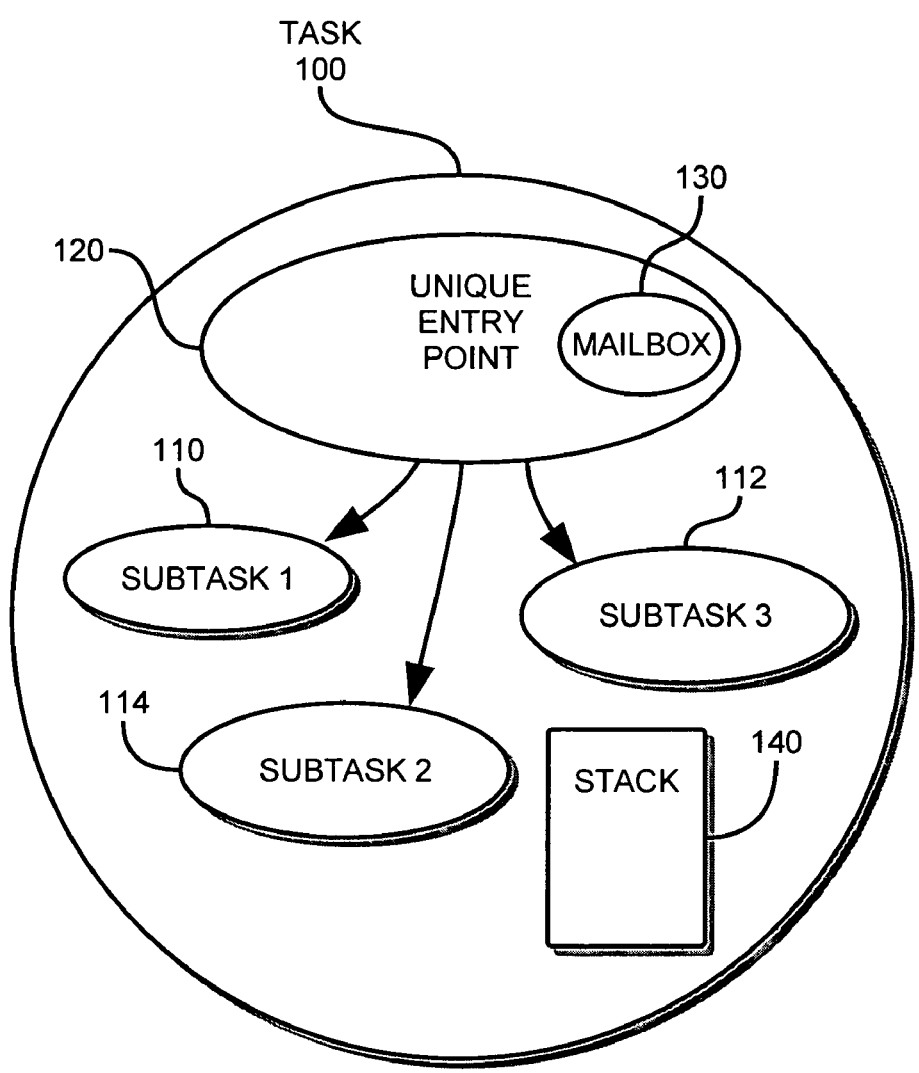
FIG. 1 is a block diagram illustrating a task architecture in accordance with an embodiment of the invention.

The present invention provides a method and apparatus for implementing and managing tasks and sets of tasks or subtasks (referred to herein as "supertasks"). Embodiments of the invention allow a developer of computer software to easily implement tasks and supertasks, and improve the execution speed and memory use at run time compared with existing methods for implementing computer operations.

In the following description, numerous specific details are set forth to provide a more thorough description of the invention. However, it will be apparent to one skilled in the art that the invention may be practiced without these specific details. In other instances, well known features have not been described in detail so as not to obscure the present invention. The claims following this description are what define the metes and bounds of the invention.

Terminology

The invention is described below in terms of Real Time Operating Systems (RTOS), however, the invention is not restricted thereto The general concepts, methods and systems described below may be used to simplify software programming and to enhance runtime performance in any software environment. For example, the invention may be utilized to enhance one program code to simulate execution of the program code in a different computing environment.

In the following description, the terms "developer" and "programmer" may refer to a person, such as a computer program developer, using a computer application and/or to one or more processes interacting with a computer application or system. A "process" may be any computer program executing locally or remotely and may be triggered by one or more events. An "event" is defined as the occurrence of a low-level action (e.g., software or hardware interrupt), a high-level action (e.g., keyboard input from a user), or a combination of actions.

The term "function" may refer in a broad sense to a functionality provided by a software program, and may refer more specifically to a block of computer program code. Depending on the programming language, the block of program code may be called, for example, a routine, subroutine, method or procedure.

In the art of computer software development, the term "compiler" may refer to a program for converting code from a high level computer programming language to a low level computer program code. In the process of compiling, the compiler may run several other programs that perform specific steps in the process of generating the code. For example, a compiler may comprise a syntax analyzer, a preprocessor, an interpreter and any other program that may take part in the process of generating code. Used herein, the term "compiler" may refer to any and all of the components involved in generating the program code from a higher level source code.

The invention may be implemented as a computer program based on a modularized architecture as will be described below. Each component may be implemented as part of a larger infrastructure (e.g., within an application server) or as a plug-in, applet, DLL (dynamic link library), etc. that may be embedded within, or interfaced with third party applications. Though described in modular terms for purposes of illustration, embodiments of the invention need not be confined to a modular structure. For example, parts of the invention may be implemented in a new compiler or a standalone application, or may be embedded in an existing compiler to enhance the latter's capabilities.

The invention described herein is set forth in terms of methods and systems implementing those methods. It will be apparent, however, to one with ordinary skill in the art that the invention may be implemented as computer software, e.g., computer program code capable of being stored in the memory of a digital computer and executed on a microprocessor.

Task-Based Operating Environment

In a multi-tasking computing environment, a system switches between multiple programs to maintain the virtual simultaneity of program execution. In real-time operating systems, for example, the programs may be composed of one or more tasks. Each task is a piece of code designed to run, stop, and resume running. For instance, a running program may need to stop and wait for new input. In the meantime, another program or another task within the same program may be executed.

FIG. 1 is a block diagram that illustrates a task architecture in accordance with an embodiment of the invention. A task 100 typically comprises any number of subtasks (e.g., subtasks 110, 112 and 114), a unique entry point 120, a mailbox 130 and a stack 140.

The task architecture allows a real-time operating system to manage the proper execution of programs. Each task is assigned a priority level, and is associated with a stack 140. A first task may be preempted by a second task with higher priority, for example, which requires the system to momentarily suspend the first task. The system uses the stack 140 to preserve the state of the first task when the first task suspends. As previously described, when a task "A" stops or suspends and a task "B" resumes, a "context switch" occurs. In the context switch, the registers of task A are saved to stack A. The registers of task B are restored from stack B.

Among other reasons in support of a task architecture are time-slicing, which enables a system to allot a slice of time to each task; and multi-processing, which allows a system to split an application into several tasks that may run on separate processors. However, using existing task architecture, a program quickly becomes complicated. For example, if a function "F" runs in task A, it is not possible in existing operating systems to directly call function F from task B. In existing real-time operating systems, the way to call a function F from task B is by sending a message to task A (containing information on what function to call, and call parameters); stopping task B; starting task A; dispatching the message within task A to the appropriate sub-task; invoking function F; stopping task A when function F is done, and resuming task B.

When creating applications for existing task-based operating environments, a programmer has to be aware of all the program requirements, such as where a function should run, and what type of messages to send between different tasks and functions. A programmer must, for instance, prepare for each function call a message with all the parameters necessary for a function call, and store the message in mailbox 130 associated with a task (e.g., task 100). When the task is invoked, for example, by calling the task's entry point 120, the message is dispatched to the appropriate subtask (or function) within the task.

Figure 2:
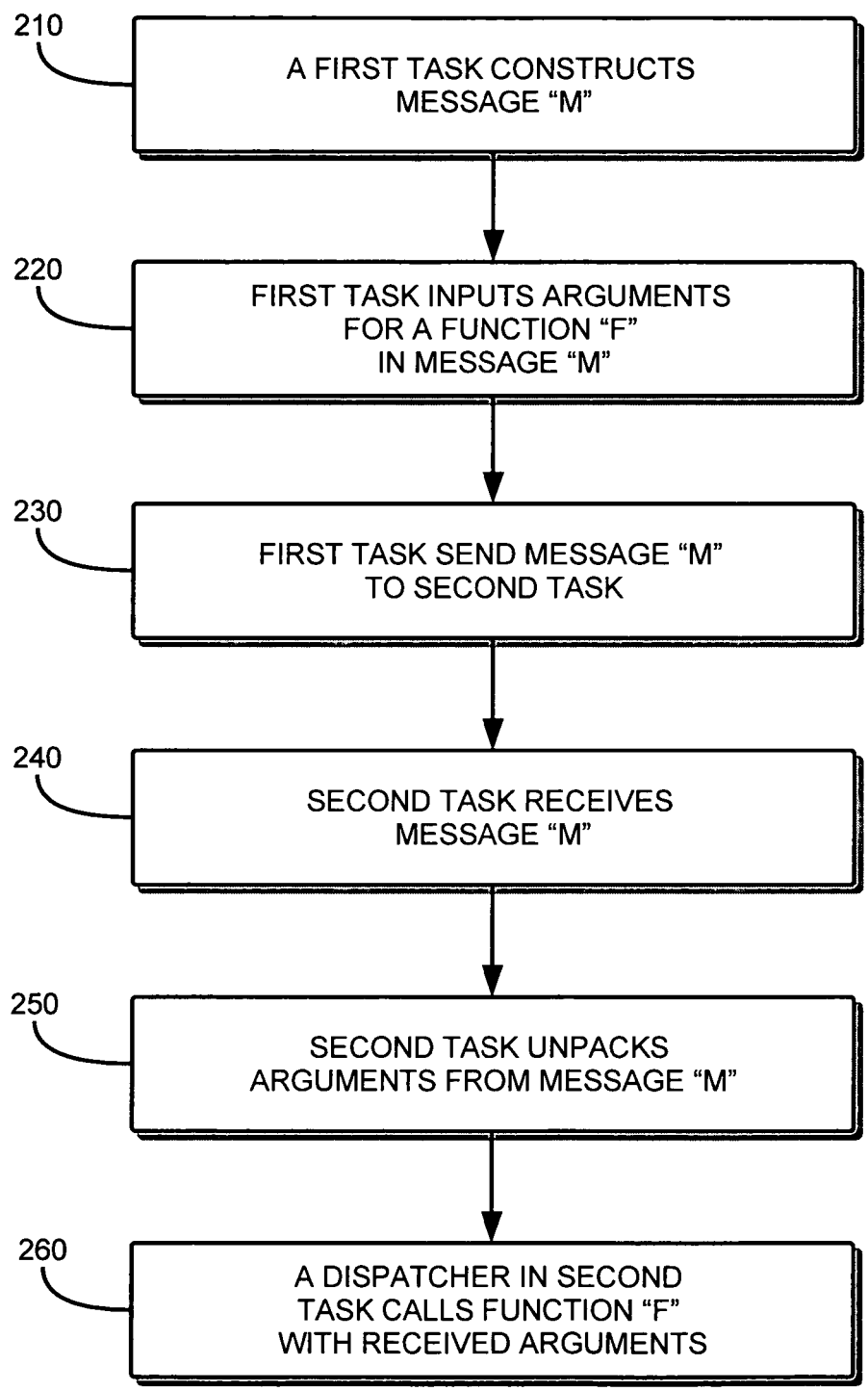
FIG. 2 is a flow diagram illustrating a process for constructing components to invoke a task in accordance with an embodiment of the invention.

FIG. 2 is a flowchart illustrating a process for constructing components to invoke a task in accordance with an embodiment of the invention. At step 210, a first task constructs a message "M". Constructing message M may involve determining the target task, the target function pointers of a second task and the required parameters to pass to the function. At step 220, the first task packs function arguments in message M. At step 230, the first task sends message M to the target task by inputting, for example, the message in the mailbox of the second task. The latter step may involve storing the message in a stack before the second task is invoked.

At step 240, the second task accesses the message once it is invoked by the system. Typically, the task is invoked by calling the associated entry point, which in turn invokes the mailbox. At step 250, the second task unpacks the message to retrieve the arguments to a function.

At step 260, a dispatcher in the second task calls the target function with the received arguments. The target function is then invoked.

Automating Task Implementation

Embodiments of the invention may provide a language compiler, interpreter and/or preprocessor to implement priority functions. The latter compiler makes the implementation straightforward, by automatically handling priority functions. As such, the job of a real time programmer is simplified. Furthermore, simulation code can be relatively quickly turned into real time embedded software.

Using an embodiment of the invention, a programmer may not need to declare function arguments inside message structures, or program messages between tasks as is the case of tasks in existing real-time operating systems. The programmer may simply add a few directives to the source code, which the compiler detects, analyzes and converts to a definition of priority levels.

An embodiment of the invention allows a programmer to automatically implement the computer instructions that enable a task to be invoked, exchange messages between tasks and perform a switch from one task to another.

In embodiments of the invention, a programmer may declare a function "F" as a Task Function by using a directive preceding the function, such as line number 1 in listing 1.

Listing 1:

1. _task_(T)
2. void F(...)
3. {
4.     <zero or more lines of function code>
5. }

Listing 1 is for illustration of a declaration only. Thus, the arguments and body of function "F" are not shown. Furthermore, since function "F" may normally not return a value, it may be declared of return type "void".

The declaration in listing 1 may indicate that function "F" may run in a default task "T". A programmer may also specify a mailbox of the task. For example, the programmer may declare a mailbox by adding a second parameter, such as "_task_(T, MB)", or using a construct such as a prefix (e.g., T_mailbox) such that the mailbox may be derived from the name.

In embodiments of the invention, a programmer may implement a call to a Task Function in a similar way as a function call in a high level programming language (e.g., C or C++). A task function may be called from anywhere in the code, and from any other task. The compiler is enabled to recognize the declaration and implements the function calls without requiring the programmer to provide each step of the instruction code and/or the function parameters. The compiler also provides an automatic generation of code to provide message communication between tasks.

A compiler implementing an embodiment of the invention may convert a function call, such as F(Argument 1, Argument 2, etc.), into a task function that runs in a task by creating a wrapping code or new entry points. The entry points may be defined by, but not limited to, the following:

1. The existing (or default, or standard) entry point of the function is preserved. It refers to the starting point of a function as implemented in standard program code (e.g., binary code).

2. A "new" entry point of the function may be added as the function's first time invocation entry point.

3. An entry point is created for calling the function from the dispatcher.

When a function is invoked for the first time, it checks whether the task that possesses the function being invoked is currently active. If so, the function is called immediately by jumping to the function's standard entry point. When the function is finished, then the program returns to the calling code as usual. Otherwise, if the task that possesses the function to be invoked is not currently active, the arguments of the function and the entry point data for the dispatcher may be saved in a message. The message may be handled by a memory manager. The message is then sent to the mailbox (e.g., block 130).

In one or more embodiments of the invention, a dispatcher may receive the message, obtain the function's entry point for the dispatcher from the message, call the entry point, and free the memory block holding the message by returning it to the Memory Manager. Alternatively, the entry point for the dispatcher may unpack the arguments of the function from the message, and call the function by jumping to the function's standard entry point.

When the function terminates, it returns to the caller, i.e., the Dispatcher, which can dispatch other messages.

In embodiments of the invention, the invoked function may be executed in a different task than the default task. This may be achieved by calling the function in accordance to Listing 2 below.

Listing 2:

__task__(T1, MB1) F(...);

In the case of Listing 2, the function may be executed in a task (e.g., task "T1") having an individual mailbox (e.g., mailbox "MB1"). In the case where the mailbox's name may be derived from the task's name (e.g., by adding a known suffix), it may not be necessary to supply the mailbox name. A compiler or preprocessor embodying the invention may automatically handle the creation of the necessary code to call the function by creating a non-standard mailbox entry point, that executes the same steps as "new" entry point with the possible exception that the task and the mailbox may not be the default ones for the task, but rather they are supplied in the call as extra arguments.

When calling a function, usually only one entry point is known, the standard entry point. Embodiments of the invention may position the non-standard mailbox entry point at a given memory distance from the "new" entry point in order to be able to derive the non-standard mailbox entry point's position from the "new" entry point. Alternatively, an embodiment of the invention may merge both entry points, and utilize a call parameter or flag to indicate whether the call is for the default task or otherwise.

In one or more embodiments of the invention, the pre-processor may determine whether passing extra arguments to the non-standard mailbox entry point may be done i.e., whether a register is available for storing extra arguments. Alternatively, an embodiment of the invention may pass arguments via a global variable, independently of the preprocessor. However, since a global variable may be compromised in the case of preemption by a higher priority level, an embodiment of the invention may implement global variables that are associated with priority level.

A compiler implementing an embodiment of the invention may be programmed to create full instructions (i.e., inline instructions) and optimized depending on whether the compiler knows at compile time from which task a function is being called. For example, if a function "F" is being repeatedly called from the same task "T", the compiler may generate a direct call to the standard entry point, which would incur no overhead. In other instances, the compiler (and or the pre-processor) may be enabled to receive input (e.g., user input) that indicates that a function call is occurring within a given task. The latter may be achieved, for example, by having the standard entry point accessible to the caller.

Task, Mailbox and Dispatcher

Listing 3 provides a sample code that a programmer using an embodiment of the invention may provide to create a task (e.g., task "T"), and to start it. When the task starts, it calls the task's entry point, for example, T_entry_point (see line 1 of Listing 3). The programmer may fill out the contents of the task's entry point as shown in Listing 3, lines 2 through 10.

Listing 3:

```
1.  void T_entry_point(void) {
2.     mailbox_create(&T_mailbox);
3.     while ( 1 )
4.     {
5.        void *message = mailbox_receive(&T_mailbox);
6.        stuff_before( );
7.        dispatcher(message);
8.        stuff_after( );
9.     }
10. }
```

At line 2 of listing 3, the entry point function allows for the creation of a mailbox.

The task may suspend execution while waiting for messages (see Listing 3, line 3). Most of the functions running in this task are called via a dispatcher. Furthermore, one or more function calls (e.g., stuff_before( ) and stuff_after( )), may be provided for executing code every time a message is received before and after the dispatcher is invoked. Embodiments of the invention allow a programmer to implement any and all of steps above automatically.

Memory Manager

In one or more embodiments of the invention, a Memory Manager may be implemented as an efficient dynamic memory handler. A memory manager may be likened to the well known "malloc" and "free" functions of the C language, which allow for allocating memory and freeing a previously allocated memory, respectively. However, standard "malloc" and "free" functions may be undesirably inefficient for the use in the context of implementing tasks. One or more embodiments of the invention provide a higher performance function for managing memory allocation and management, which comprises communicating with tasks to mailbox data and pointers (e.g., entry point pointers).

Timer Manager

A Timer Manager handles time events. Calling a function at a given time via a Timer Manager involves tedious work of packing and unpacking function arguments in a message. Embodiments of the invention allow a programmer to automatically implement a Timer Manager. For example, a programmer may declare a function "F" that needs to be called at a given time "t" within a task "T" as a Task Function. The programmer may then call the function "F" as shown in Listing 4.

Listing 4:

__time__(t) F(...);

The code in Listing 4 may indicate to the compiler to implement a call to the Timer Manager causing function "F" to be called at time "t". In the latter example, function "F" may be a Task Function, and task "T" may call the Dispatcher on every received message.

A compiler (or preprocessor) embodying the invention may automate the implementation of the Timer Manager by creating two new "Timer" entry points for a function "F". A first "Timer" entry point (e.g., entry point Ft1) is called when the instruction to call the function through the timer (e.g., _time_(t) F( . . . )) is issued. The latter entry point may store the function F's arguments and the entry point for the dispatcher in a memory block "M" obtained from the Memory Manager (see the description above in relation with the "new" entry point). The first "Timer" entry point may call the Timer Manager with a pointer to a second "Timer" entry point "Ft2", a pointer to the memory block "M", and the time value "t". When time "t" is reached, the Timer Manager calls the entry point "Ft2" with a pointer to memory block "M". The second "Timer" entry point may send the memory block "M" to the mailbox of the task. The task receives the message "M" and the Dispatcher does the rest of the job of calling the target function.

In embodiments of the invention, the method steps described above may be generalized to any application code that needs to call a Task Function when an event occurs. For example, a Signal Manager may be called following the occurrence of a signal in order to call a function. An embodiment of the invention enables a programmer to implement and call such a manager as shown in Listing 5.

---
Listing 5:

_signal_(S) F(...);

---

Listing 5 causes a Signal Manager to attach a function call "F" to signal S, and hence to call function "F" when signal "S" is posted.

Calling a Function via a Function Pointer

In Listing 4's instruction "_time_(t) F( . . . );", if function "F" is a symbol that is known at compile time (or at preprocessing time), then the compiler or preprocessor may determine the associated symbol for the first "Timer" entry point. However, if function "F" is a function pointer, the compiler (or preprocessor) may not determine the entry point at compile time. Embodiments of the invention provide several solutions.

Using a function pointer to the first "Timer" entry point instead of a pointer to the function. The programmer may use a function pointer to the first "Timer" entry point "Ft1" instead of "F" in the function call following a_time_(t) directive. This is the simplest solution and the most efficient from an implementation point of view. However, it may require a little more effort from the programmer to handle the function pointer to "Ft1".

Passing arguments to entry point Fn. The new entry point Fn could receive extra arguments which it decodes in order to ascertain whether the programmer is issuing a direct call to function "F" or an indirect call via the entry point (e.g., "Ft1"). The extra arguments can be passed in registers or on the stack. The arguments may also be passed via global variables, which may entail disabling interrupts for a short period of time (or an equivalent solution).

Embodiments of the invention may also employ other design enhancements that automate the implementation of tasks in a real-time operating system, such as:

Automatic generation of the task's entry point function.
Automatic creation and handling of the mailbox.
Automatic estimation of a task's stack space. Measure the Hardware and Software Interrupts stack space independently. Estimation is done during the debugging phase. The programmer can help by increasing the stack space if needed.
Automatic task creation. The programmer only supplies the task names and/or priority levels.

Priority Functions

Priority functions as may be implemented in embodiments of the invention are described in Applicant's copending U.S. patent application Ser. No. 11/197,825, filed Aug. 5, 2005, which is incorporated herein by reference in its entirety.

Embodiments of the invention can allow a system to run different code segments at different priority levels. A function may be directly assigned a priority level without creating tasks. A priority function may be a usual function (e.g., C or C++ function) to which a priority level is assigned. The call to a priority function may be similar to a regular function.

When invoking a priority function, if its priority is above the priority of a currently running function, the former is called immediately. If its priority is below the priority of a currently running function, the request is stored in a database and the function is called when all higher priority functions have terminated.

The execution of a priority function proceeds like a standard function. A priority function is capable of executing without a dedicated stack, though the programmer may choose to implement a function specific stack, if desired.

When a priority function is called, the system does not require a context switch. Since priority functions do not need a separate stack, and since the context switch is minimal, a large number of priority functions can be defined without degrading performance or wasting system resources. Therefore, every sub-task in the traditional real-time operating system sense can be re-defined as an independent priority function, assigned any priority level, and called from anywhere in the code.

In embodiments of the invention, a priority function may take one or more arguments. An argument may be implemented as a pointer to a message to be delivered to the function. This messaging system provides inter-function communication. Embodiments of the invention may be implemented with or without message queues and/or mailboxes to execute function code.

In accordance with one embodiment of the invention, a priority function does not suspend execution while waiting for a new message. Rather, the function is called when a message is ready. Since a priority function does not suspend execution, semaphores are not typically used to protect shared data. Embodiments of the invention may provide dedicated priority functions that handle access to the shared data at a fixed priority level. The shared data may implicitly act like a first-in-first-out (FIFO) buffer. In another embodiment of the invention, the system may raise the priority level over the critical section, similar to the "priority ceiling" in traditional real-time operating systems.

In one or more embodiments of the invention, a priority function "F" may not suspend its own execution to wait for the result of another priority function "G". If the result of "G" is necessary, the priority function "F" may be attached to a signal that is delivered when "G" is finished executing. In the latter case, it may be necessary to split the priority function "F" into two priority functions, "F1" and "F2". "F1" may run the code that is independent of the result of "G", and "F2" may be attached to a signal delivered by "G", and that runs after "G" is done.

In one or more embodiments of the invention, it is possible to mix priority functions and tasks within one system. Priority functions are more efficient than tasks, since they do not need a dedicated stack. However, in some embodiments of the invention, priority functions may be encapsulated inside a task in order to achieve time-slicing when needed.

In embodiments of the invention, priority functions may be implemented and/or called via an Application Programming Interface (API) routine that may decide at which point the priority function is called, e.g., based on the priority level of the priority function. If the priority function is not called immediately, it may be stored in a database for delayed execution. The API routine may take for arguments the priority function, the priority level, and the message to be passed to the function.

A database for storing functions (or references thereto) may, for example, possess a linear structure or a binary tree structure sorted in decreasing order of priorities. In one embodiment of the invention, a database may be implemented by limiting the total number of priority levels. In this latter case, priority functions at each level may be stored in linked lists. A bit associated to each level may be stored in one or two integers, and set to "1" when the linked list is non-empty. A fast algorithm may be used to detect the highest bit that is set to 1, and therefore the highest priority function awaiting execution.

Embodiments of the invention may prevent accidental calling of priority functions as a normal function (which results in a priority level violation). In one or more embodiments of the invention, it is possible to hide the priority function, and to define a priority function handler that contains a pointer to the priority function. Thus, only the handler may be made visible to external code. Alternatively, the priority function may be made visible only through a cover function that calls the priority function via the API routine.

Priority functions may return values via the message that was initially sent to them. In the message, one or more fields can be reserved for any return values. In the latter case, the priority function does not free the message before returning. If the caller expects to receive the result from the priority function immediately after the call, the priority function may be assigned a priority higher than (or equal to) the priority of the caller. The message may be allocated on stack (instead of in dynamic memory) for more efficient code. An API may be provided that checks if the priority levels are consistent. If not, the API may report an error.

Priority Objects

In embodiments of the invention, an object such as a data structure may be assigned a priority level. A priority object may be any data structure or a resource that has been assigned a priority level. The functions, in this case, may be methods that perform operations on one or more objects with one or more priority levels. A priority function may inherit the priority level of the object it is processing. Priority objects may be viewed as a layer on top of the priority functions. The priority level of an object may be set at instantiation time of the object. The priority level may be inherited from a parent type or from a module's set of priorities.

In embodiments of the invention, an object may be assigned several priority levels as a multi-priority object. One priority level, (e.g., the highest priority level) may be reserved to update the object's data. Another priority level may be assigned to one or more methods that may operate on the object.

In embodiments of the invention, a priority object may be defined as a data structure along with a priority handler. The priority handler is a structure that comprises the priority level of the object. The priority handler may be embedded in the object's data structure, so that both may be allocated in one step. The priority level may be initialized when the object is created. Also, the priority level may be inherited by any priority function to which the object is passed.

In embodiments of the invention, for debugging purposes, a priority object may be defined with a special keyword recognized by a pre-processor. The pre-processor may track the object throughout the code to verify that the object is accessed only via valid priority functions (e.g., its methods). The latter may be achieved more easily in object oriented programming languages. Alternatively, violations can be detected at run-time.

Embodiments of the invention allow a programmer to implement priority functions and priority objects by properly adding declarations in the source code of a program. A compiler (or pre-processor) then automatically generates the computer code that allows a system to execute priority functions and priority objects and to manage calls to them.

Supertasks

A "Supertask" may be defined as a collection of subtasks. In embodiments of the invention, a supertask may be a collection of priority functions with a dedicated stack, for example. A supertask is not necessarily larger than a common task (though it can be), rather it provides a more powerful programming structure than a common task, as will be apparent from the following description.

Figure 3A:
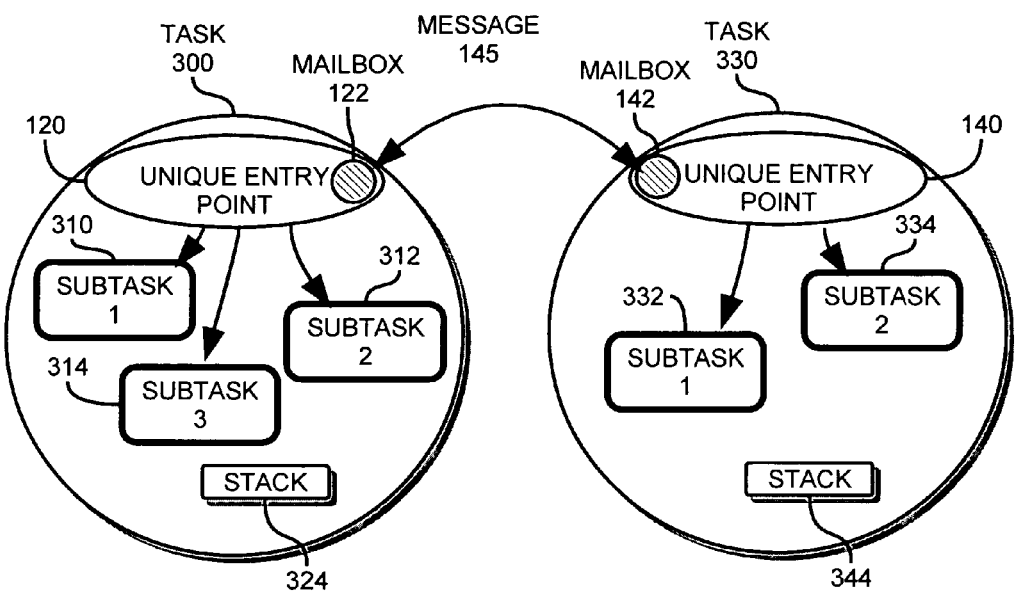
FIG. 3A is a block diagram that illustrates tasks and task operation in accordance with existing real-time operating systems.

FIG. 3A is a block diagram that illustrates tasks and task operation in accordance with a real-time operating system. A task (e.g., task 300 and task 330) may comprise a number of subtasks such as 310, 312 and 314 for task 300 and subtasks 332 and 334 for subtask 330, respectively. Each task may comprise a unique entry point (e.g., entry point 120 and 140). An entry point is also where a task suspends execution at the end of an execution cycle, and waits for new messages. A task may comprise a mailbox (e.g., mailboxes 122 and 142), or message queue that handles received messages. A mailbox serves for exchanging communication messages. A task also comprises a dispatcher for appropriately dispatching messages to subtasks within a task.

Generally, calling subtasks from another task is done via the unique entry point (e.g., entry points 120 and 140), which comprises the mailbox (e.g., mailbox 122 and 142). Such a call involves handling the mailbox and dispatching messages to the subtask. Switching between tasks in this scenario entails a context switch that is relatively heavy. All registers have to be saved for one task, and they have to be restored for the other task.

Ordinarily, subtasks within a task share a common stack (e.g., stack 324 and 344), and eventually other resources such as a common heap. The subtasks run in a sequential fashion at the same priority level. Although the priority level is able to be momentarily changed, the change affects all subtasks simultaneously. As a consequence, a subtask 310 of task 300 cannot preempt subtask 332 within the same task 300. The priority level change has an effect only when it occurs in a given task, such as task 330, while being called from an outside task, such as task 300.

In developing program code for the example of FIG. 3A, the programmer pre-programs and manages all the necessary steps, such as invoking subtasks, changing priority levels, dispatching messages etc. These steps require a significant amount of software programming as well as CPU cycles and memory resources at execution time.

Figure 3B:
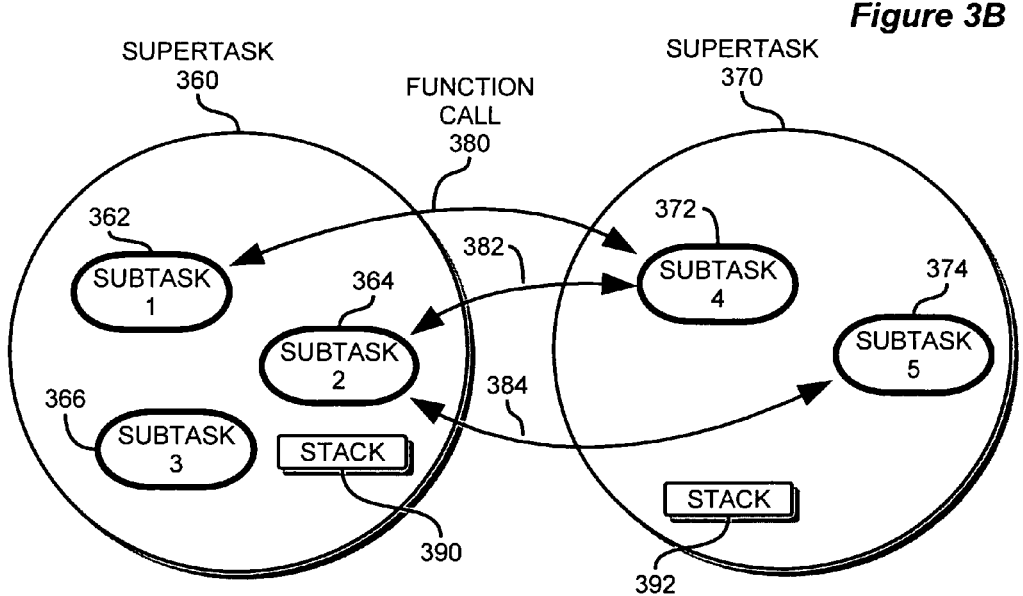
FIG. 3B is a block diagram illustrating supertasks in accordance with an embodiment of the invention.

FIG. 3B shows a block diagram that represents supertasks in accordance with an embodiment of the invention. A supertask, such as 360 or 370, is also a collection of subtasks.

However, each subtask in an embodiment of the invention may be a priority function. Being a priority function, a subtask is essentially independent except that it shares a common stack, and potentially other resources such as a heap, with other subtasks within a supertask.

In embodiments of the invention, a subtask that is a priority function confers multiple advantageous properties to the supertask, including but not necessarily limited to the following:

- A subtask that is a priority function possesses its own entry point into the supertask, hence providing the capability of directly calling the subtask from outside the supertask.
- A supertask can wait for two or more different events without requiring special event handling processes, which is different from technology that utilizes a mailbox and unique entry point.
- Because a mailbox architecture may not be needed, intertask messaging is more efficient and less complex.
- Subtasks belonging to one supertask may have different priority levels.
- Higher priority subtasks may preempt lower priority subtasks within a supertask. The concepts of priority functions and priority objects described above may apply to subtasks of a supertask in embodiments of the invention.
- Due to the fact that subtasks are independent and, like regular functions, they return the registers to their original state upon termination. Thus, a context switch between supertasks is more efficient than a context switch between tasks in existing technology where, in most cases, the context switch is either half or nearly non-existent.
- Interrupt response jitter may be higher with traditional tasks because context switches are less efficient and may need to lock interrupts for longer periods of time.
- Since subtasks can have different priority levels, priority inversion issues can be avoided. For example, when a subtask is too urgent, it may be given a higher priority level and may be forbidden access to critical data. Alternatively, the critical data may be managed by special high priority functions.
- Using an embodiment of the invention, most of the real time burden such as creating entry point functions, handling mailboxes, creating messages, dispatching messages, rearranging the source code to suit the mailbox and entry point, etc, may be eliminated. Therefore, creating a real time product from non-real-time software (or simulations) is faster with supertasks and priority functions than it is with tasks. In addition, because much of the implementation may be performed by the compiler (or preprocessor, etc.), the original, non-real-time software source can remain substantially intact and hence more portable.
- Few extras are required to manage supertasks (no mailbox, no entry point function, etc), so it is simple to turn off the real time aspect of the operating system and to test the code in non-real-time. This allows debugging non-real-time and real-time problems separately.
- Temporary supertasks can be defined during debugging time for memory protection between various pieces of software. Once the code has been debugged, the supertasks can be easily turned off to improve performance and decrease stack usage.

Since it owns a dedicated stack, a supertask can be suspended (e.g., via a semaphore) just like a traditional task. When a supertask is suspended, all its subtasks are automatically suspended. As far as the scheduler is concerned, what happens is that the subtasks (priority functions) are postponed until the supertask resumes. Even if a subtask has a high priority level, it gets postponed if it belongs to a suspended task.

In theory, supertask behavior may be emulated by assigning a dedicated task and stack to every subtask. However, such an approach may be infeasible because stack space dramatically increases. With the architecture of an embodiment of the invention, subtasks share stack space, thus saving memory space.

In an embodiment of the invention, separate software applications running on a processor may be defined as separate (distinct) supertasks. Each software application may possess a dedicated stack and heap. Thus, multi-processor architectures can run supertasks on two or more processors. Supertasks may be time-sliced, and their memory can be protected against "accidental" access.

Priority Functions Outside of Supertasks

In embodiments of the invention, priority functions may be implemented to run outside of any supertask. Such priority functions may utilize the currently active stack, which leads to more efficient code. However, such priority functions cannot suspend execution. They act like hardware or software interrupts. Such priority functions may be assigned a priority level above the priority level of priority functions that belong to tasks, e.g., to simplify the scheduler. The priority functions running outside any supertask may have a dedicated scheduler and dedicated priority space (e.g., a segment above the supertask priority space).

A Compiler Augmented with Supertask Capabilities

An embodiment of the invention provides capabilities to a programming language compiler, interpreter or preprocessor to implement supertask capabilities such as those described above. The following describes how a compiler, interpreter or preprocessor can be augmented to automatically handle the addition of priority functions and priority objects in source program code. As such, the work involved in developing real-time applications is much simplified. In addition, an embodiment of the invention allows a developer to quickly turn simulation code into real-time embedded software.

An embodiment of the invention enables a programmer to declare a supertask by inserting simple code instructions that the compiler translates into implementation code from an Application Program Interface (API). The API code may implement code for reserving stack space, as well as other resources such as a heap. A supertask can be assigned a default priority level, which subtasks may inherit if they do not define their own priority level. Listing 6 shows a simple line of declaration for implementing a supertask.

| Listing 6: |
| --- |
| API_taskCreate(supertask, stack, heap, ...); |

Using the example declaration of Listing 6, a compiler recognizes the supertask and creates a handle to that supertask. The handle allows for access to the supertask in order to perform actions on the supertask, such as checking and/or modifying the status of the supertask and the current priority level, checking all the currently active or pending priority functions within the supertask, and deleting the supertask if needed.

Compiler Augmented with Supertask Management

In embodiments of the invention, the scheduler may provide services, such as the following (using exemplary syntax):

1. API_call: For calling priority functions. A priority function "F" may be called directly. It is called via API_call that handles priority levels. API_call may be invisible to the programmer and auto-generated by directives (e.g., _priority_and_task_). Also API_call may sometimes be inlined by the compiler to improve execution speed.

2. API_suspend: For suspending a supertask.

3. API_resume: For resuming a supertask that was previously suspended.

4. API_hwi: If a hardware interrupt calls priority functions, this API follows the hardware interrupt to restore supertask and priority function context.

Priority Functions as Subtasks

Using an embodiment of the invention a programmer may declare a function "F" as a priority function, i.e., a subtask within a supertask "T". The function declaration (or prototype) of "F" may be preceded by the directives shown in Listing 7.

Listing 7:

1. _task_(T) _priority_(P)
2. void F(int a, double *b);

In an embodiment of the invention, the two directives of line 1 of Listing 7 may also be combined into one directive (e.g., _priority_(T, P)). The latter directive is an example that indicates to the compiler that, by default, function "F" has priority "P" and belongs to supertask "T". When a programmer calls "F(x, y)" the compiler automatically generates a call for "F" inside supertask "T", at priority level "P". Task "T" and priority "P" may be dynamic variables or expressions evaluated at run-time, e.g., an expression containing arguments of "F". An embodiment of the invention may allow for omitting "P", thus causing the subtask to inherit the default priority level of the supertask. Similarly, if the supertask "T" parameter is omitted, the subtask may be a priority function that runs outside any supertask.

An embodiment of the invention may allow for overriding the default settings "P", "T" by calling "F" preceded by the same a directive, e.g., "_priority_" with the appropriate parameters e.g., "P1" and "T1". The declaration may then appear as:

_task_(T1)_priority_(P1) void F(x, y);

Hence, in embodiments of the invention, a priority function "F" may easily be called inside any supertask and at any priority level. If a parameter (e.g., "P1" or "T1") is omitted, default values may be used. It is noteworthy that in order to avoid modifying existing source code, it is possible to place the directives and priority function prototypes in separate files which may be made available to the compiler as included headers, or using any other method available for including source code. The latter method maintains portability of the source code.

Timers and Signals as Subtasks

Embodiments of the invention can enable programs to invoke a subtask "F" at specific times. A call to a function or subtask may be scheduled at a given time "t" in the future using a directive such as Listing 8.

Listing 8:

_time_(t) void F(x, y);

In accordance with the example of Listing 8, a function "F" may be called at time "t", inside its default supertask "T", at its default priority level "P". However, in order to change the default priority level of "F" to different parameters, a call as shown on Listing 9 may be made.

Listing 9:

_time_(t) _priority_(P1) void F(x, y);

Similarly to declaring a time for invoking a function as a given time, embodiments of the invention can enable a programmer to invoke a function in response to a signal. A declaration, such as shown in the example of Listing 10, may be inserted to implement the code for triggering a function "F" with a signal "S".

Listing 10:

_signal_(S) void F(x, y);

Calling a Priority Function within a Supertask

Figure 4:
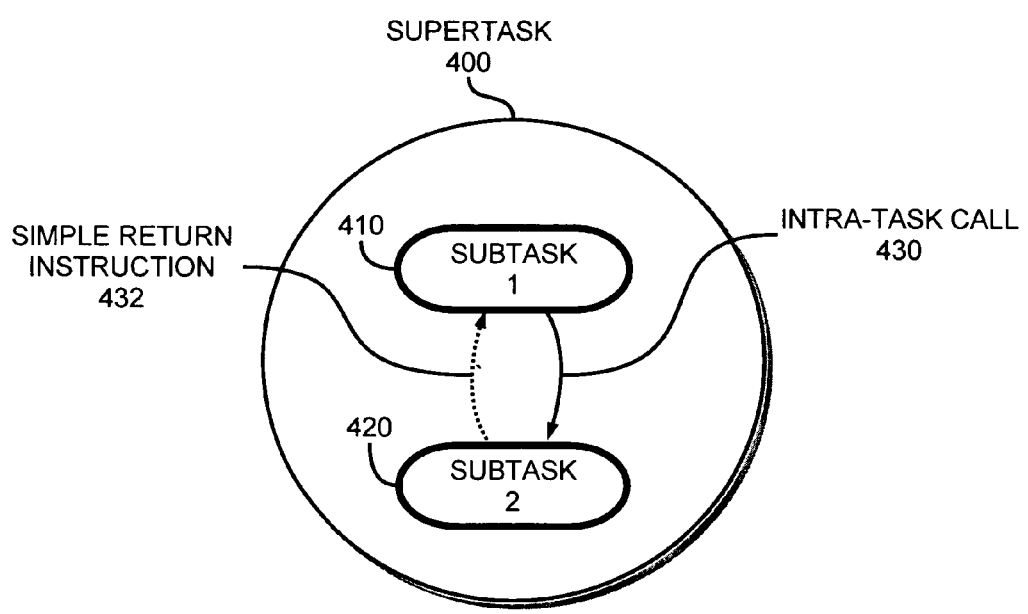
FIG. 4 is a block diagram of an inter-supertask function invocation in accordance with an embodiment of the invention.

FIG. 4 is a block diagram that represents an inter-supertask function invocation in accordance with an embodiment of the invention. In the example of FIG. 4, a task 400 comprises two priority functions 410 and 420. A priority function 410 may call another priority function 420 within the same supertask using standard function invocation methods (e.g., function call 430), and without requiring a context switch, contrary to the prior art. Similarly, the return arguments can be passed from the function being called to the caller function using simple return instruction 432, without requiring a context switch.

Calling a Priority Function from Outside a Supertask

Figure 5:
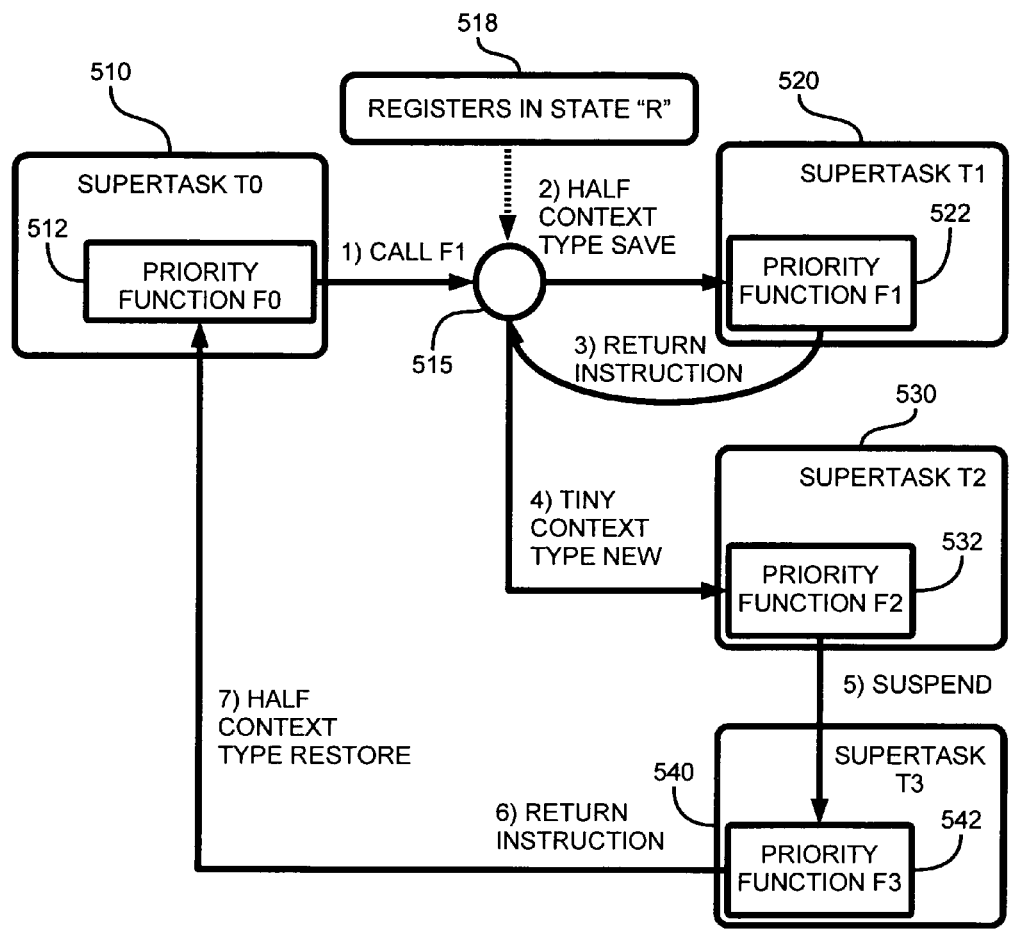
FIG. 5 is a block diagram illustrating an example of inter-task calls in accordance with an embodiment of the invention.

FIG. 5 illustrates an example of intertask calls in accordance with an embodiment of the invention. The example of FIG. 5 shows four (4) supertasks 510, 520, 530 and 540, respectively labeled "T0", "T1", "T2" and "T3", and each having a respective priority function 512, 522, 532 and 542 (labeled "F0", "F1", "F2" and "F3", respectively). In the example, a call is made from "F0" to "F1". When "F1" returns, "F2" and "F3" have been scheduled. First, "F2" is called, and it suspends without returning. "F3" is then executed. When "F3" returns, "F0" proceeds.

When the currently running supertask is "T0", the currently running priority function is "F0" and the current priority level is "P0". The following describes the process, in accordance with one or more embodiments, that occurs when a priority function "F", with priority level "P", that should run in supertask "T," is called via API_call. The scheduler determines whether the priority function "F" should be called right away, or if it should be postponed and stored in the list of pending priority functions. The priority function is postponed if one of the following is true:

1. Current level is hardware interrupt level. (This means supertask "T0" was preempted by a hardware interrupt and the hardware interrupt is calling the priority function.) In one embodiment, priority functions are always postponed when called from hardware interrupt level.
2. Priority level "P" is strictly less than current priority level "P0".
3. Priority level "P" is equal to current priority level "P0" and supertask "T" is different from supertask "T0". (Note that if "T" and "T0" are identical, "P" and "P0" are equal, then the priority function "F" may be called immediately. See above for further details on priority functions scheduling.)
4. Supertask "T" is in suspended state.

In all other cases, a priority function may be immediately called. An example implementation is as follows:

If supertasks "T" and "T0" are identical, then a normal function call takes place as described above. Nothing need be done regarding the stack. If supertasks "T" and "T0" are different, then a "Half Context Switch-Type Save" occurs. Essentially, only the registers of the running supertask are saved before switching to the new supertask. There are no registers to be restored for the new supertask because the function call is starting from zero.

Before calling a new priority function "F" in supertask "T", the scheduler needs to keep track of the currently executing priority function "F0" in supertask "T0" so that "F0" can be resumed later. This can be done by leaving some information on the stack such as the instruction pointer address.

Argument Passing Across Different Supertasks

A priority function "F0" running in supertask "T0" can call a priority function "F" running in supertask "T" ("T" different from "T0") and pass it arguments in the following ways. First, the arguments of "F" that are stored in registers may be automatically passed. No additional action is required by the scheduler. Secondly, the arguments of "F" that are stored on stack are copied from stack "T0" to stack "T" (or directly written to stack "T" if the compiler is able to perform the job). This is more efficient than creating messages to carry the arguments across supertasks. The foregoing may be employed if the function "F" is the currently highest priority function in supertask "T". Otherwise, other more urgent functions may need to execute and the stack may be busy.

Supertask Management

Embodiments of the invention may provide one or more of a plurality of implementations of a scheduler. In an embodiment of the invention, a simple implementation may separate a task scheduler from a priority function scheduler. Thus, switching between supertasks may involve a context switch where all the registers of one supertask are saved and all the registers of the other tasks are restored. Such a scheduler, however, does not take advantage of the property of priority functions that returns all registers to their original state after execution. Nor does such a scheduler take advantage of the fact that, when starting a new priority function in a different supertask, there may be no state to restore. Therefore, in most situations there is no need to save and/or restore registers.

One or more embodiments of the invention implement a more complex scheduler that takes full advantage of the properties of priority functions to improve performance. For each supertask a scheduler may maintain a hash table with bitmap containing all awaiting priority functions (which may exclude those that have already started). Additionally, the scheduler may maintain a sorted linked list containing one node per supertask for all supertasks. Each node may contain the priority level of the current highest priority function in the supertask (awaiting or already started). The nodes may be sorted by priority level order. Hence, the most urgent supertask is the one whose node is at the head of the linked list. The most urgent priority function is the highest priority function in the supertask. When the highest priority level becomes that of a different supertask, a switch to the higher priority supertask takes place.

The scheduler may also maintain a list of supertasks. Each supertask may be marked with its current status, such as running, pending (i.e., ready and waiting), suspended (e.g., on semaphore), etc. The list of supertasks may also be sorted according to the current priority level order, where the current priority of a supertask is set to the currently highest priority level in that supertask. When a priority function starts executing, it may be removed from the list of pending priority functions. Hence, it may not be necessary to store the list of priority functions that may be immediately executed, i.e., without postponement. The latter improves performance. In addition, if a priority function is temporarily stopped in order to switch to another supertask, a descriptor may be created for the latter priority function and stored in the list of pending priority functions. The descriptor may specify how to resume the priority function, for example. Alternatively and more efficiently, the stack may be used to store the information that allows for resumption of priority functions.

The priority lists may be optimized for priority level sorting and access, for example, using bitmap hash tables or any other method for speeding data access. The lists should preferably preserve the priority functions' calling order across supertasks. In order to achieve this, one solution is to use a bitmap common to all supertasks. However, a common bitmap may slow down performance when supertasks are suspended, since finding the highest priority function also entails a search over non-suspended supertasks. Alternatively, embodiments of the invention may keep one bitmap per supertask and mark a priority function by its calling order. A calling order may comprise a number (e.g., a 32 or 64-bit number) which may be incremented for each new call.

Context Switching

In embodiments of the invention, when switching from a supertask (e.g., "T0") to another supertask (e.g., "T"), a context switch may be carried out using one or more of a plurality of methods. Contrary to traditional real-time operating systems, where a context switch always involves saving the registers of a running task and restoring the registers of a newly invoked task, embodiments of the invention that implement supertasks may render some of those operations unnecessary. The following examples address several different context switching situations between a first function "F0" of a supertask "T0" and a second function "F" of a supertask "T":

1. Where "F0" is being executed and the execution is switched to "F" previously started, the registers of "T0" are saved and the registers of "T" are restored. A jump instruction may be used to resume function "F". This form of context switch may be referred to as a "Full Context Switch". It is similar to the method utilized in traditional real-time operating systems. In embodiments of the invention, the full context switch may be carried out concurrently with supertask "T0" suspension or a decrease of its priority level to below that of "T".

2. When "F0" has not yet terminated and "F" has not been previously started (i.e., "F" is newly invoked), then the registers of "T0" are saved, and "F" is started without restoring any registers. This partial form of a context switch may be referred to as a "Half Context switch-Type save". Other lower priority functions in supertask "T" may have been started and may be waiting to proceed. Hence, the stack of "T" may not be empty. The function "F" may use the stack to start from the stack's current state. Upon termination, function "F" may return the stack to that state. If "F" is being directly called from "F0", then it is possible to save only part of the registers of "F0", i.e., those portions that should be preserved by "F". If "F" is being called after hardware interrupt preemption, then fewer registers need to be saved (i.e., those that the hardware interrupt did not already save).

3. When "F0" has terminated and "F" was previously started, and if the state of the registers is not as expected by "F" (i.e., function "F0" did not return the registers to what "F" is expecting), then the registers of "T" are restored. The step of saving the registers of "T0" may be omitted, since "F0" has terminated. This form of context switch may be referred to as a "Half Context Switch-Type Restore".

4. When "F0" has terminated and "F" was previously started, and if the state of the registers matches what "F" expected, then no registers are saved or restored. This truncated form of context switch may be referred to as a "Tiny Context Switch-Type Resume". This is the case when "F0" returns the state of the registers to what "F" expected.

5. When "F0" has terminated and "F" was not previously started (i.e., "F" is a new function call), then no registers are saved. The latter may be referred to as a "Tiny Context Switch-Type New":

Context Switching Management

The following example illustrates some of the mechanisms by which an embodiment of the invention may manage context switching. It will be evident to one of ordinary skill that these mechanisms may be combined (or invoked) in one or more different ways in order to handle various other context switching scenarios.

In an embodiment of the invention, a supertask is in "sleep" state or an "inactive" state, in which no priority function is running or waiting. In this state, its dedicated stack is empty. When a call to a priority function of the supertask is made, the supertask is awakened from the "sleep" state into an "awake" or "active" state, which describes the state of being active or immediately accessible and the stack may not be empty. Several priority function calls can be made (for a given supertask) while the supertask is active. When no function in a given supertask is running, the supertask becomes inactive (goes back to "sleep" state).

While awake, a supertask alternates between the "running" state and the "paused" state. Only one supertask at a time can be in running state, and this is the supertask that is holding up the CPU. All other supertasks are either paused or sleeping. The paused state occurs when the supertask is waiting for the CPU, i.e., "ready" state, or when the current highest priority function is in "wait" state (e.g. waiting on a semaphore), or when the entire supertask is in "suspended" state.

In a supertask, only one priority function may be running at a given time. This is the priority function with the highest priority level. At any point in time, the stack contains priority function parameters and variables that are stacked in order of priority level. Hence, lower priority levels must wait until the higher priority levels terminate. It may be impossible to access the underlying elements of the stack, thus the state of a supertask is largely dictated by the current highest priority function.

If the current highest priority function is in the "wait" state, a new call to an even higher priority function may still execute. Different levels in the supertask may have different status, i.e., a supertask can be waiting and ready simultaneously. Thus, unlike existing real-time operating systems, more urgent subtasks can still be processed even when less urgent subtasks are in a waiting state. This is possible in a traditional real-time operating system where a traditional task is either waiting or ready, but cannot be both. Existing real-time operating systems must create a new task/stack (which can be heavy on the system), or use software interrupts (which result in unstructured and complicated code that is partly in tasks and partly in interrupts).

In the case where a call is made to a priority function in "T2", supertask "T1" is required to pause. Supertask "T1" is running and then a switch to supertask "T2" occurs. If the switch occurs by starting a new priority function, which may temporarily alter the CPU registers, the new priority function returns the registers to their original state when it terminates. In the latter switch back, the system may take advantage of the fact that registers have been restored by the terminating priority function, and omit restoring the registers when switching back to "T1". Before the system omits the register restoration step, the following conditions should be satisfied to ensure that the CPU registers were already returned to their original state by the terminating priority function:

1) The switch to supertask "T2" must start a new priority function "F2", rather than continue a previously started priority function.
2) Before switching back to "T1", the new priority function "F2" must terminate.
3) After "F2" terminates, if a third priority function "F3" is called just before returning to "F1" (possibly in a supertask T3 different from T2), then the same conditions apply to "F3". "F3" must terminate before switching back to T1. We can say that "F3" inherits the conditions on "F2": it starts from and ends at the same points as F2.
4) When all priority functions such as "F2" and "F3" have terminated and a switch back to supertask "T1" is due, the supertask "T1" must be in the same state before calling "F2". "T1" must not have progressed to another state (e.g., by continuing function "$F^1$" or by virtue of another preempting priority function).

These conditions may be tracked by creating an information tracking data set that allows for tracking the state of execution at a given time. For example, a register stamp may represent the state of the registers at a given time. For clarity, the term "cookie" will be used to refer to the information tracking data set (or register stamp). Cookies may be used to improve performance. In systems where the number of registers is small, cookies may be omitted.

Figure 6:
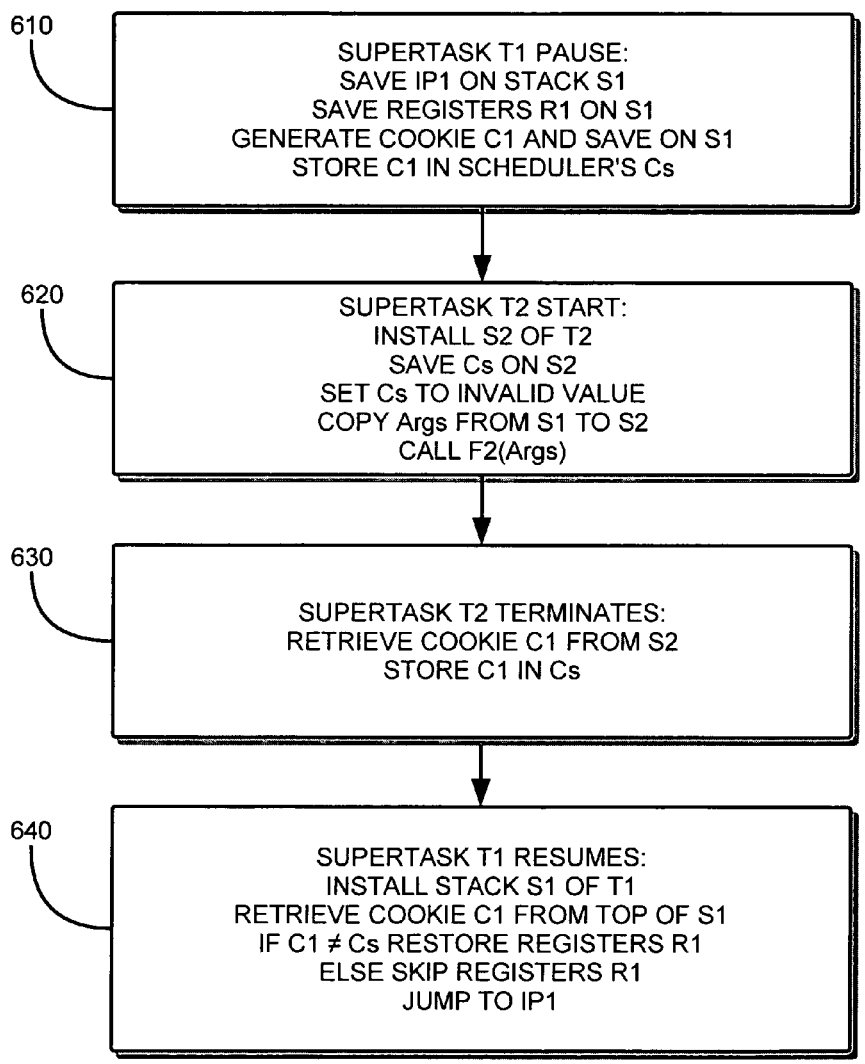
FIG. 6 is a flow diagram illustrating a process for managing a context switch while a call is made to a priority function between two supertasks, in accordance with an embodiment of the invention.

FIG. 6 illustrates example steps for managing a context switch while a call is made to a priority function between two supertasks, in accordance with an embodiment of the invention. The example shows a first supertask denoted by "T1" having a stack denoted by "S1", and a second supertask denoted by "T2" having a stack denoted by "S2".

Before the switch to supertask "T2" takes places, a new cookie "C" is generated, e.g., a number that is incremented after each generation. The cookie represents the state of the registers of "T1" at that point. The cookie C is stored on the stack of "T1" and is also delivered to "F2".

When "F2" terminates, its associated cookie is cross-checked with the cookie at the top of the stack of "T1". If the cookies match, it means that "T1" is still at the same point and "F2" returned to that original point. In this situation, registers do not need to be restored. If the cookies do not match, it means that "T1" has moved to a different point. If before returning to "F1" a new function "F3" is called, then "F3" inherits the cookie from "F2", and the same cookie comparison is applied to "F3" when it terminates.

At step 610 of FIG. 6, supertask "T1" is paused, or rather some priority function "F1" running in "T1" is paused, such as after calling a higher priority function in a different supertask, or in order to wait on some event. The system saves instruction pointer IP1 on stack S1 and registers R1 on stack S1, generates new cookie C1, saves cookie C1 on stack S1, and stores cookie C1 in scheduler's cookie variable Cs.

At step 620, supertask "T2" is started (or rather a new highest priority function, F2(Args), in "T2" is called while "T2" is not running). The system installs stack S2 and other resources of supertask T2, saves Cs on S2, sets Cs to an invalid value, copies the arguments of F2(Args) onto S2 and calls F2. The arguments are normally on S1, created either by "F1" or by a preempting interrupt that may use a common stack. Some of the arguments may already exist in registers and therefore may not be copied.

At step 630, supertask "T2" terminates (or rather the priority function "F2" terminates). The system retrieves cookie C1 from S2 and stores it in scheduler cookie variable Cs.

At step 640, the system resumes supertask T1. The system installs stack S1 and other resources of T1, and retrieves cookie C1 from the top of S1. If C1 is different from the value of the scheduler cookie variable Cs, the system restores CPU registers R1, otherwise the system may skip restoration of CPU registers R1, and jump to instruction pointer IP1.

The above can apply to the case when "T1" and "T2" are the same supertask. Normally, when "T1" and "T2" are the same, it indicates an intra-supertask call that may be processed by a simpler and more efficient priority function scheduler (see above description). However, the following situation may also arise. Supertask "T1" calls a different supertask "T3". Then, supertask "T3" calls new higher priority functions in supertask "T1". Now there are two sets of calls in supertask "T1", a lower priority set and a higher priority set, and they are separated by calls in supertask "T3". If supertask "T3" is suspended and if the higher priority set in "T1" ends, it is time to switch back to the lower priority set in "T1". This represents a type of switch within the same supertask T1. The registers are restored by the system in this situation, because the point of return is not the termination of T3's functions. In fact, the cookies will not match. What happened is that two switches via T3 were compressed into one switch within T1.

When a hardware (or software) interrupt preempts a running supertask "T1" and installs a call to a higher priority function in a different supertask T2, the steps to follow are very similar to the above steps. The hardware interrupt first runs on the stack S1 of T1. When the hardware interrupt is done, it returns to the scheduler, e.g., via a call to API_hwi. The scheduler simply returns to the previous function in T1, if it finds that no higher priority functions have been installed. But in this case, a higher priority function has been installed. Hence, instead of returning to T1, the scheduler calls the new priority function in T2. This involves a switch to supertask T2. The hardware interrupt can be assimilated with a priority function in T1. Hence, everything appears as if a priority function call occurred (the hardware interrupt) that called a function in T2. All of the supertask switch steps above will then apply.

Priority Space

In one or more embodiments of the invention, a unique space may be defined for all priority levels and all supertasks. For example, two different supertasks may possess subtasks that span the full space of priority levels. Also, distinct (orthogonal) priority spaces could be defined for different supertasks. For example, two different software applications could have distinct (orthogonal) priority spaces. In the latter case, embodiments of the invention manage priorities using a time-slicing scheme (e.g., round robin method) or other method that lets the two applications, for example, share the same processor.

Changing Priority Level

In accordance with an embodiment of the invention, a change of the priority level of a supertask may occur as follows:

1. Increasing the priority level of the supertask may be a result of increasing the priority level of the currently active priority function, or it may be the result of adding a positive offset to all priority functions within the supertask.

2. A negative offset may be added to all priority functions within a supertask to lower the priority level of one priority function within the supertask.

Memory Access Protection

It is sometimes necessary to prevent one supertask from accidentally calling the wrong function address in another supertask (which results in a system crash). In traditional real-time operating systems, the mailbox being the only entry point, the task cannot directly call a function address in another task. However, with supertasks, any function address can be called. For this reason, an embodiment of the invention may implement a mechanism to prevent bad calls.

One embodiment of the invention utilizes the compiler to generate a vector table for each supertask. The vector table may contain the addresses of priority functions in the supertask that are accessible from other supertasks. The vector table may be published and accessible by all supertasks. On the other hand, the code space of each supertask may be protected and inaccessible via direct calls. When calling a priority function in a different supertask, an indirect call may be generated via the vector table. The scheduler reroutes the call to the supertask after changing the memory access settings. The vector table option could be turned on during debug time, for example, and turned off in the final product.

Thus, a method and apparatus for implementing and managing priorities of computer operations and sets of tasks have been provided. Embodiments of the invention provide a framework for developing applications that implement and manage the sequence of execution. This framework removes much of the programmer's overhead work necessary in a traditional real-time operating system, where a major effort is required to obtain a clean design of tasks, mailboxes, and other components.

Particular embodiments described herein are illustrative only and should not limit the present invention thereby. The invention is defined by the claims and their full scope of equivalents.

What is claimed is:

1. A method for implementing priority management of computer program operations on a system comprising a processor and a computer readable medium having instructions stored thereon comprising program code, the method comprising:

the processor obtaining a first program code comprising at least one declaration for at least one subtask, wherein said at least one subtask is further associated with a priority level;

the processor obtaining a second program code comprising at least one declaration for a supertask, said supertask comprising at least one reference to said at least one subtask; and the processor generating a third program code comprising program code for invoking said at least one subtask and managing said supertask using said priority level, wherein higher priority subtasks may preempt lower priority subtasks within a supertask.

2. The method of claim 1, wherein obtaining said first program code further comprises obtaining at least one priority function declaration indicating said at least one function is to be called with a priority level.

3. The method of claim 1, wherein said obtaining said second program code further comprises obtaining at least one declaration for creating at least one stack.

4. The method of claim 3, wherein said obtaining said second program code further comprises obtaining at least one declaration for creating one or more schedulers.

5. The method of claim 4, wherein said one or more schedulers comprise program code for sorting said at least one reference using said priority level.

6. The method of claim 5, wherein said one or more schedulers further comprise program code for storing said at least one reference into said at least one stack.

7. The method of claim 1, wherein said generating said third computer program further comprises generating program code for activating an inactive supertask.

8. The method of claim 7, wherein said generating program code further comprises generating program code for managing a context switch between a plurality of supertasks.

9. The method of claim 8, wherein said generating program code for managing said context switch further comprises generating program code for storing a first supertask register state indicator.

10. The method of claim 9, wherein said generating program code for managing said context switch further comprises generating program code for comparing said first supertask register state indicator with a current supertask register state indicator.

11. The method of claim 10, wherein said generating program code for comparing further comprises generating program code for restoring one or more processor registers to a predetermined state when said first supertask register state indicator differs from said current supertask register state indicator.

12. A computer program product embodied in a computer readable storage medium, said computer program product comprising:
    program code configured to cause a computer to invoke a subtask associated with a supertask and a priority level;
    program code configured to cause a computer to invoke a scheduler for managing an invocation of said subtask, wherein higher priority subtasks may preempt lower priority subtasks within a supertask; and
    program code configured to cause a computer to switch an execution context.

13. The computer program product of claim 12, further comprising program code configured to cause a computer to store a state of a currently executing supertask in a stack associated with said supertask.

14. The computer program product of claim 13, further comprising program code configured to cause a computer to invoke a scheduler associated with said supertask.

15. The computer program product of claim 14, wherein said scheduler is configured to generate a sorted set of a plurality of active supertasks using said priority level.

16. The computer program product of claim 15, wherein said scheduler is further configured to store said sorted set into said at least one stack.

17. The computer program product of claim 16, further comprising program code configured to cause a computer to manage a context switch between a plurality of supertasks.

18. The computer program product of claim 17, further comprising program code configured to cause a computer to store a supertask register state indicator.

19. The computer program product of claim 18, further comprising program code configured to cause a computer to compare said supertask register state indicator with a current register state indicator.

20. The computer program product of claim 19, further comprising program code configured to cause a computer to restore a state of one or more processor registers when said supertask register state indicator differs from said current register state indicator.

21. A computer program product comprising a computer readable medium having computer program code embedded therein, said computer program code comprising:
    a supertask having a plurality of functions and a common stack, wherein each of said functions comprises a respective priority level and a respective entrypoint into said supertask, wherein higher priority functions may preempt lower priority functions within a supertask.

22. The computer program product of claim 21, wherein a first function from said plurality of functions has a different priority level than a second function from said plurality of functions.

23. The computer program product of claim 21, wherein a first function from said plurality of functions is runnable while a second function from said plurality of functions is suspended.

24. The computer program product of claim 21, wherein said supertask is configured to handle a plurality of events, wherein a first entrypoint of said superask is configured to wait on a first event and a second entrypoint of said supertask is configured to wait on a second event.

25. The computer program product of claim 21, wherein said supertask further comprises a cookie indicating a processor register state of said supertask, and wherein said computer program code is configured to compare a previously stored cookie value with said cookie when a context switch is made to said supertask, and skip a processor register update during said context switch when said scheduler cookie variable and said cookie match.

26. The computer program product of claim 25, wherein said computer program code is further configured to obtain said cookie from said supertask when a context switch is made away from said supertask.

27. The computer program product of claim 21, wherein one or more of said functions is configured to be responsive, via said respective entrypoint, to direct function calls from outside of said supertask.

* * * * *